United States Patent Office 2,852,507
Patented Sept. 16, 1958

2,852,507

METHOD OF PREPARING POWDERED SALT-FREE CELLULOSE ACETATE-DICARBOXYLATES

Carlton L. Crane and John Emerson, Rochester, N. Y., assignors to Eastman Kodak Company, Rochester, N. Y., a corporation of New Jersey No Drawing. Application February 23, 1955
Serial No. 490,118

3 Claims. (Cl. 260—225)

This invention relates to a method of preparing cellulose acetate dicarboxylates such as cellulose acetate phthalate in a form readily susceptible for use and free of any salts therein which might derogatorily affect the viscosity of the material which involves treating the cellulose ester with dilute aqueous mineral acid.

The first method which was employed commercially for making cellulose acetate phthalate or like esters involved the reaction upon partially hydrolyzed cellulose acetate with phthalic anhydride and pyridine. This method had many disadvantages but the products which were obtained had desirable viscosity properties. There has since been developed a method of preparing cellulose acetate phthalate or the like in which the cellulose acetate is esterified with phthalic anhydride using acetic acid as the solvent and an alkali metal acetate as the catalyst to promote the reaction. The esterification mass resulting from this procedure using a water soluble solvent allows an instant dilution with water so that the precipitation of the cellulose ester formed can be carried out quite readily and economically. It has been noted, however, in the case of many of the products obtained by this procedure that cellulose esters are obtained exhibiting viscosities in certain organic solvents which are undesirable.

One object of our invention is to provide a method of preparing cellulose acetate phthalates or like esters having a viscosity such that their solutions in organic solvents are readily flowable. Another object of our invention is to provide a method of preparing cellulose esters of the type specified in which the ester is obtained in a powdered, readily dissolvable condition. Other objects of our invention will appear herein.

In its broadest aspects our invention comprises the steps of subjecting the cellulose acetate phthalate or like ester, which has been prepared by a procedure in which cellulose acetate is esterified with a dicarboxylic acid anhydride in a bath containing acetic acid solvent and alkali metal acetate catalyst, to treatment with a dilute aqueous mineral acid, which treatment removes the residual salt which is ordinarily present therein and leaves the product in a comminuted form. This treatment may be accomplished either by precipitating the cellulose ester in water having little or no hardness and subsequently treating the ester with mineral acid or by precipitating the cellulose ester from its solution with aqueous mineral acid. The mineral acids which we have found to be especially useful in the treatment of cellulose esters in accordance with our invention are sulfuric, hydrochloric or phosphoric acid. The amount of effective mineral acid which is employed is at least equivalent to the amount of alkali metal ion which is present or not more than 10% greater than that amount. If the cellulose ester is precipitated in dilute aqueous mineral acid the amount of mineral acid which is employed is figured on the basis of the alkali metal acetate catalyst which is employed, which catalyst may be either sodium acetate, potassium acetate or lithium acetate. This invention relates to cellulose acetate dicarboxylates in which the dicarboxylic anhydride employed may be an anhydride such as phthalic anhydride, nitrophthalic anhydride, succinic anhydride, maleic anhydride or the like.

The preparation of a powdered salt-free cellulose acetate phthalate would be obtained from hydrolyzed cellulose acetate in accordance with our invention by the following procedure: The cellulose acetate is introduced into an esterification bath essentially consisting of phthalic anhydride, acetic acid as the solvent and an alkali metal acetate such as sodium, potassium or lithium acetate as the catalyst. After the cellulose acetate phthalate has been formed our invention may be applied in either one of two ways:

(1) By precipitating the cellulose ester in water of little or no hardness such as distilled water or permutit softened water and treating the thus obtained cellulose ester with dilute aqueous mineral acid; or (2) By precipitating the cellulose esterification mass into a large volume of water having therein sufficient mineral acid to react with the alkali metal acetate which was employed as the catalyst in the reaction. It is ordinarily desirable to use an excess of mineral acid over the amount of sodium ion which is present up to but not exceeding 10% excess. After the cellulose acetate phthalate has been obtained in powder form, it is separated from the liquid thereon, washed, or if not treated with mineral acid stirred with aqueous mineral acid, and after thorough washing, dried. The product thus obtained is readily dissolvable in organic solvents such as acetone and is free of salts which will cause undue elevation of viscosities of those solutions. Another effect of the treatment with mineral acid is to produce products having a lowered ash content. The following examples illustrate our invention:

*Example 1*

32 parts of acetic acid, 19.2 parts of phthalic anhydride and 8 parts of anhydrous sodium acetate were placed in that order in a jacketed sigma-bladed stainless steel mixer and mixed for 15 minutes at 60° F. There was then added thereto 16 parts of cellulose acetate having an acetyl content of approximately 32.4% and while running the mixer the reaction temperature was allowed to rise to 176° F. over a period of 6 hours.

25 parts of the reaction solution obtained were placed in a jacketed sigma-bladed stainless steel mixer at a temperature of 140° F. There was added thereto a mixture of 40 parts of distilled water and 3.4 parts of 96.7% sulfuric acid over a period of 30 minutes and the temperature was slowly reduced while running the mixer. Cooling was continued over 1 hr. 45 min. during which time precipitation occurred and the temperature dropped to 58–60° F. The precipitate obtained was drained, transferred to a false bottom wash tank and washed in 130° F. of distilled water until the free acidity of the product was less than 5.0% and then dried. The dry product analyzed as follows: free phthalic acid 1.5%; combined phthalyl 37.8%; viscosity in 15% acetone solution at 25° C. 71.0 cps.; ash content 0.067%.

*Example 2*

The remainder of the esterification solution as obtained in the preceding example was cooled to 140° F. 115 parts of distilled water at 32–40° F. were added to the mixer. The mass was stirred for 1½ hours and then cooled to 58–60° F. The product was thereby precipitated to a dense, powdery material. The liquid was removed therefrom and the powdered product was divided into 2 parts. One portion which was designated B was washed in 130° F. distilled water until the acidity of the product was less than 5% and dried at 150° F. The other part designated B-1 was removed from the mixer after precipitation and was treated with 7 parts of 1% aqueous sulfuric acid per part of the product for 5 hours at room temperature. The product was then drained, washed with 130° F. distilled water until the free acid content of the product was reduced below 5% and was dried at 150° F. Analysis of the product indicated the following:

|  | B | B-1 |
|---|---|---|
| App. Phthalyl_____percent__ | 36.8 | 36.9 |
| Free Phthalyl_____do____ | 0.6 | 1.2 |
| Comb. Phthalyl_____do____ | 35.9 | 35.1 |
| Visc. at 15% conc. in acetone at 25° C_____cps__ | 83 | 68 |
| Ash_____percent__ | 0.127 | 0.050 |

*Example 3*

50 parts of a dry cellulose acetate phthalate which had been prepared by the sodium acetate process, which product had not been treated with mineral acid, were suspended in 1000 parts of distilled water. 9.2 parts of concentrated sulfuric acid were stirred into the suspension and the mass was agitated for 5 hours. The product was then drained, washed thoroughly in distilled water and dried. A comparison of the product thus obtained with the untreated material as regards viscosity in organic solvents is as follows:

| Analysis | Untreated, cps. | Treated, cps. |
|---|---|---|
| Viscosity, 15% conc. in acetone at 25° C_____ | 201 | 121 |

We claim:

1. A method of preparing a salt free cellulose acetate dicarboxylate which comprises reacting upon cellulose acetate with a bath containing a dicarboxylic acid anhydride, acetic acid solvent and an alkali metal acetate catalyst, precipitating the cellulose ester thus formed from the esterification mass by adding thereto sufficient water free of calcium hardness to render the mass nonsolvent of the cellulose acetate dicarboxylate, separating the cellulose ester from the liquid mass and treating that ester with an aqueous mineral acid selected from the group consisting of sulfuric acid, hydrochloric acid and phosphoric acid.

2. A method of preparing a salt free cellulose acetate phthalate which comprises esterifying cellulose acetate with an esterification bath containing phthalic anhydride, acetic acid solvent and sodium acetate catalyst, precipitating the cellulose ester thus formed from the esterification mass by adding thereto sufficient water substantially free of calcium hardness to render the mass nonsolvent of the cellulose acetate phthalate, separating the cellulose ester from the liquid mass and treating that ester with an aqueous mineral acid selected from the group consisting of sulfuric acid, hydrochloric acid and phosphoric acid.

3. A method of preparing a salt free cellulose acetate phthalate which comprises esterifying cellulose acetate with an esterification bath of phthalic anhydride, acetic acid and sodium acetate catalyst, precipitating the cellulose ester thus formed from the esterification mass by adding thereto sufficient distilled water to render the mass nonsolvent of the cellulose acetate phthalate, separating the cellulose ester from the mass and treating the ester with aqueous mineral acid selected from the group consisting of sulfuric acid, hydrochloric acid and phosphoric acid.

References Cited in the file of this patent

UNITED STATES PATENTS

| 2,285,536 | Seymour et al. | June 9, 1942 |
| 2,379,309 | Malm et al. | June 26, 1945 |
| 2,759,925 | Hiatt et al. | Aug. 21, 1956 |